United States Patent Office 3,076,844
Patented Feb. 5, 1963

3,076,844
METHOD OF PREPARING ALKOXYBENZOYL DI-ALKYL GLYCINEAMIDES
Torizo Takahashi, Kikuo Ogiu, Hajime Fujimura, Isao Satoda, Tomijiro Fukui, and Yasuo Yamamoto, all of Kyoto, Japan, assignors to Nippon Shinyaku Co., Ltd., Kyoto, Japan, a corporation of Japan
No Drawing. Original application June 7, 1960, Ser. No. 34,382. Divided and this application May 23, 1961, Ser. No. 111,925
2 Claims. (Cl. 260—559)

The present invention relates to a method of preparing certain lower alkoxybenzoyl di-lower alkyl glycineamides having analgesic, antipyretic and antispasmodic properties. This application is a division of copending application Serial Number 34,382, filed June 7, 1960, now abandoned.

According to this invention, a compound of the formula:

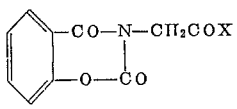

wherein X is lower alkoxy (OR) or di-lower alkyl amido ($NR_2$), having 1 to 6 carbon atoms in each alkyl radical, is subjected to ring opening with a base to form an intermediate of the formula:

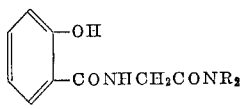

and then etherified at the hydroxyl group to form a final compound of the formula:

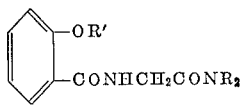

wherein R and R' are the same or different lower alkyl groups having 1 to 6 carbon atoms. The symbol X is, for example, $OCH_3$, $OC_2H_5$ or $N(CH_3)_2$.

An exemplary method according to the foregoing is for the preparation of N-2-methoxybenzoyl-N',N'-dimethyl-glycineamide by subjecting a compound of the formula

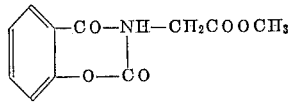

to ring opening with a base such as dimethylamine to form the intermediate

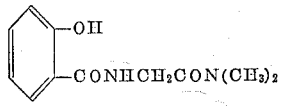

and methylating the hydroxyl group of such intermediate to form the compound

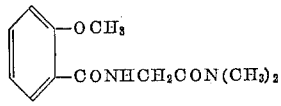

The invention is further illustrated by the following non-limitative examples:

*Example I*

A mixture of 136 grams of methyl 2,4-dioxodihydro-1,3-benzoxazinyl-(3)-acetate and 320 ml. of a 40% aqueous solution of dimethylamine was stirred at room temperature. The mixture became a clear solution with rise in temperature. After cooling, the solution was concentrated in vacuo, acidified with acetic acid, and the crystals which separated were washed with water and methanol. The filtrate was concentrated to give an additional amount of crystals which were combined with the previously obtained crystals to give 88 grams (68.5%) of N-2-hydroxybenzoyl-N',N'-dimethylglycineamide of M. Pt. 176–7° C. Analysis calculated for $C_{11}H_{14}N_2O_3$ (molecular weight 222.24): C, 59.45%; H, 6.35%; N, 12.60%. Found: C, 59.46%; H, 6.39%; N, 12.59%.

*Example II*

To 9 grams of ethyl 2,4-dioxodihydro-2,3-benzoxazinyl-(3)-acetate, there was added a 50% aqueous solution of dimethylamine warmed slightly and let stand for a while. The resulting solution was concentrated and then treated to give 4.5 grams (58.5%) of N-2-hydroxybenzoyl-N',N'-dimethylglycineamide of M. Pt. 176–7° C. by refluxing said solution, with a solution of 5 grams of freshly prepared salicyloyl chloride in 10 ml. of chloroform in the presence of 4.3 grams of potassium carbonate for 1.5 hours, filtering and purifying by crystallizing the filtrate from methanol.

*Example III*

To 100 grams of 2,4-dioxodihydro-1,3-benzoxazinyl-(3)-acetodimethylamide, there was added 200 ml. of a 50% aqueous solution of dimethylamine, warmed slightly, cooled and the separated crystals washed with acidic (acetic acid) water and methanol. From the filtrate, additional crystals were obtained and combined with the previously separated crystals to give 81 grams (90.5%) of N-2-hydroxybenzoyl-N',N'-dimethylglycineamide of M. Pt. 176–7° C.

*Example IV*

The procedure of Example III was carried out using a solution of 50 grams of sodium hydroxide in 2 liters of water instead of the 50% aqueous solution of dimethylamine. The same product was obtained with the same melting point in 82% yield.

*Example V*

In similar manner, the same product was obtained using an aqueous solution of potassium carbonate in place of the aqueous solution of sodium hydroxide.

*Example VI*

The intermediate N-2-hydroxybenzoyl-N',N'-dimethylglycineamide is then alkylated, e.g., methylated, to give N-2-methoxybenzoyl-N',N'-dimethylglycineamide or other lower alkoxy, di-lower alkyl compound, wherein the alkyl radical of the alkoxy group and the alkyl groups of the glycineamide moiety have 1 to 6 carbon atoms, as follows:

A methanolic solution of 14.2 grams of sodium is dropped into a solution of 130 grams of N-2-hydroxybenzoyl-N',N'-dimethylglycineamide in methanol with heating and stirring and the resulting sodium salt is heated with 78 grams of dimethyl sulfate. To ensure completion of the alkylation, a methanolic solution of an additional 4 grams of sodium is added, then the mixture is heated with 23 grams of dimethylsulfate and the solvent evaporated. Water is added and any insoluble matter filtered out. Then an aqueous solution of sodium hydroxide is added, extracted with chloroform, the extract dehydrated and evaporated and the resulting crystals recrystallize from benzene or benzene-n-hexane to give 131 grams (90%) of product of M. Pt. 117–118° C., as colorless needles. Analysis calculated as $C_{12}H_{16}O_3N_2$ (molecular weight 236.26): C, 61.00%; H, 6.83%; N, 11.86%. Found: C, 61.25%; H, 6.78%; N, 11.89%.

In analogous manner, other members of the series such as N-2-methoxybenzoyl-N',N'-diethylglycineamide and N-2-ethoxybenzoyl-N',N'-dimethylglycineamide are produced.

The starting material is produced from 2,4-dioxodihydro-1,3-benzoxazine (alkali metal salt) in the manner set forth in said application Ser. No. 34,382, the pertinent parts of which are hereby made a part hereof.

The base used for the ring opening phase of the method is an inorganic base such as sodium or potassium hydroxide, sodium or potassium carbonate, etc., or an organic base which is a lower alkyl-substituted amine such as dimethylamine or diethylamine. The base is used in the form of its aqueous or alcoholic, e.g., methanolic or ethanolic, solutions.

What is claimed is:

1. In a method of preparing an N-2-alkoxybenzoyl-N',N'-di-alkylglycineamide, the step which comprises subjecting a compound of the formula

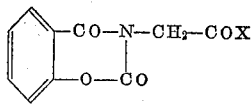

to ring opening with a di-loweralkylamine to form an intermediate of the formula

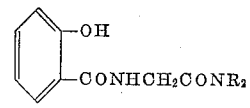

wherein X is selected from the group consisting of a lower alkoxy group of 1 to 6 carbon atoms in its alkyl part and di-lower alkylamido of 1 to 6 carbon atoms in its alkyl part and R is a lower alkyl group of 1 to 6 carbon atoms.

2. The method of claim 1, in which the di-loweralkylamine is dimethylamine.

References Cited in the file of this patent

UNITED STATES PATENTS

| | | |
|---|---|---|
| 2,822,391 | Sueter et al. | Feb. 4, 1958 |

FOREIGN PATENTS

| | | |
|---|---|---|
| 726,786 | Great Britain | Mar. 23, 1955 |
| 571,591 | Canada | Mar. 3, 1959 |